(12) United States Patent
Jeong et al.

(10) Patent No.: US 7,508,461 B2
(45) Date of Patent: Mar. 24, 2009

(54) POLARIZER INTEGRATED WITH TRANSPARENT CONDUCTIVE FILM, A TOUCH PANEL INTEGRATED WITH THE POLARIZER AND A FLAT PANEL DISPLAY INTEGRATED WITH THE TOUCH PANEL

(75) Inventors: Yun Cheol Jeong, Seoul (KR); Young Soo Ahn, Anyang-shi (KR); Jang Youl Rhee, Daejun-shi (KR); Byoung Hyun Jeong, Chungju-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/751,881

(22) Filed: Jan. 7, 2004
(Under 37 CFR 1.47)

(65) Prior Publication Data
US 2004/0189882 A1    Sep. 30, 2004

Related U.S. Application Data

(63) Continuation of application No. 09/548,677, filed on Apr. 13, 2000, now Pat. No. 6,765,629.

(30) Foreign Application Priority Data
Apr. 13, 1999    (KR) .......................... 10-1999-12904

(51) Int. Cl.
*G02F 1/1335* (2006.01)
(52) U.S. Cl. .......................... 349/12; 349/96; 345/173; 345/174

(58) Field of Classification Search ................... 349/12, 349/96, 98, 119; 345/173, 174
See application file for complete search history.

(56) References Cited

U.S. PATENT DOCUMENTS

| 4,953,952 | A | * | 9/1990 | Okumura et al. ............. 349/106 |
| 5,555,114 | A | | 9/1996 | Narita et al. |
| 5,796,509 | A | | 8/1998 | Doany et al. |
| 5,852,487 | A | * | 12/1998 | Fujimori et al. ............. 349/162 |

(Continued)

FOREIGN PATENT DOCUMENTS

JP    01214802 A   *   8/1989

(Continued)

OTHER PUBLICATIONS

*Pen Input Integrated Plastic LCD for* PDA, Monthly Display Journal, Jan. 1997, Japan.

(Continued)

*Primary Examiner*—Julie Ngo
(74) *Attorney, Agent, or Firm*—McKenna Long & Aldridge LLP

(57) ABSTRACT

A polarizer integrated with a transparent conductive film for a liquid crystal display includes a lower film an optical film and a transparent conductive film. A touch panel integrated with the polarizer is formed by attaching an upper sheet to the upper surface of the polarizer integrated with a transparent conductive film. A flat panel display with an integral type touch panel includes a touch panel integrated with the flat panel display having a lower polarizer, a liquid crystal display and an upper polarizer.

3 Claims, 4 Drawing Sheets

ENLARGDE VIEW OF TRANSPARENT CONDUCTIVE FILM 73

ENLARGDE VIEW OF UPPER SHEET 81

U.S. PATENT DOCUMENTS

| | | | |
|---|---|---|---|
| 6,020,945 A | 2/2000 | Sawai et al. | |
| 6,064,524 A | 5/2000 | Oka et al. | |
| 6,104,448 A * | 8/2000 | Doane et al. | 349/12 |
| 6,369,865 B2 * | 4/2002 | Hinata | 349/12 |
| 6,552,763 B1 * | 4/2003 | Kouya | 349/96 |
| 6,765,629 B1 * | 7/2004 | Jeong et al. | 349/12 |

FOREIGN PATENT DOCUMENTS

| | | |
|---|---|---|
| JP | 405173707 A | 7/1993 |
| JP | 05-264953 | 10/1993 |
| JP | 06-051121 | 2/1994 |
| JP | 6051121 | 2/1994 |
| JP | 95050569 B2 * | 5/1995 |
| JP | 10-048625 | 2/1998 |
| JP | 10-171599 | 6/1998 |
| JP | 410151709 A | 6/1998 |
| JP | 10228256 | 8/1998 |

OTHER PUBLICATIONS

*Trend of Resistive Transparent Touch Panel*, Monthly Display Journal, Jan. 1999, Japan.

* cited by examiner

ENLARGDE VIEW OF
TRANSPARENT CONDUCTIVE
FILM 73

ENLARGDE VIEW OF
UPPER SHEET 81

US 7,508,461 B2

POLARIZER INTEGRATED WITH TRANSPARENT CONDUCTIVE FILM, A TOUCH PANEL INTEGRATED WITH THE POLARIZER AND A FLAT PANEL DISPLAY INTEGRATED WITH THE TOUCH PANEL

This application is a continuation of U.S. patent application Ser. No. 09/548,677 filed Apr. 13, 2000 now U.S. Pat. No. 6,765,629.

This application claims the benefit of Korean Patent Application No. 1999-12904, filed on Apr. 13, 1999, which is hereby incorporated by reference.

BACKGROUND OF THE INVENTION

1. Field of the Invention

The present invention relates to a polarizer, and more particularly, to a polarizer used in a liquid crystal display. Although the polarizer of the present invention is applicable to a wide range of applications, it is especially applicable to a touch panel and a flat panel display integrated with the touch panel.

2. Discussion of the Related Art

Generally, a "polarizer" is attached to each surface of a liquid crystal display (LCD) of a flat panel display device for linear polarization of a visible light ray. A "touch panel" is an input device used, instead of a keyboard or a mouse. Such applications for the touch panel include a CAD, a production system, a game machine, a KIOSK, a POS and medical applications. The touch panel is mounted to a display screen which is an output device so that a user can make various input operations for controlling the device by manually pressing a desired position in the screen while viewing the display screen.

A touch panel is classified into a resistive film system or a capacitance system depending on its operational principle. The touch panel of a resistive film system operates by sensing a voltage or current change at a contact point of two opposite conductive layers (or resistive films) that is pressed by a user and then converting it into a coordinate value when a voltage has been applied to the two opposite conductive layers.

On the other hand, in the touch panel of a capacitance system, a small amount of electric charges is accumulated in a single transparent conductive film or transparent conductive glass in accordance with a capacitance coupling between a stylus (a pen-type input device) and the transparent conductive film at a contact point pressed by a user when alternating charge and discharge states of the capacitance are being repeated. The capacitance system touch panel operates by reading the amount of electric charges from four input points and then converting it into a coordinate value. In such capacitance system touch panel, an electrical power is applied to the stylus.

The conventional flat panel display employing a touch panel of resistive film system will be described below.

FIG. 1 is a sectional view showing the structure of a conventional flat panel display of an additive type touch panel. In FIG. 1, touch panel 50 is added to an upper surface of flat panel display 40 including lower polarizer 10, LCD 20 and upper polarizer 30. In such a conventional additive type touch panel flat panel display, since touch panel 50 is located at the uppermost portion of the flat panel display and externally exposed, it is referred to as an "outer touch panel".

In the additive type touch panel flat panel display, as shown in FIG. 1, lower polarizer 10 is provided with optical film 12 for polarizing light at the center thereof, upper film 13 and lower film 11. The upper and lower films mechanically support optical film 12 at the upper and lower surfaces, respectively. LCD 20 includes lower glass 21 and upper glass 22 that surround a liquid crystal layer. The liquid crystal layer is provided between lower glass 22 and upper glass 22. Upper polarizer 30 includes lower film 31, optical film 32, and upper film 33 in a similar manner to lower polarizer 10.

Touch panel 50 is provided with lower sheet 51 including a transparent film at the lower portion thereof to serve as a resistive film, upper sheet 52 including a transparent film at the upper portion thereof to serve as a resistive film, bus bar 53 serving as an electrode for applying a voltage to two resistive films between the lower sheet and upper sheet 52, tail 54 for connecting bus bar 53 to a controller over flat panel display 40, and a plurality of dot spacers 55 positioned on lower sheet 51 to space upper sheet 52 from the lower sheet 51. Lower sheet 51 includes a base film or glass layer and a conductive layer (or resistive film layer). Upper sheet 52 includes a conductive layer (or resistive film layer), a transparent conductive film layer and an anti-dazzling hard-coating layer. Adhesive 60 may be replaced by a double-face adhesive tape.

The conventional additive type touch panel flat panel display as described above has a problem in that, since touch panel 50 including lower sheet 51 and upper sheet 52 is added to the upper portion of flat panel display 40 which increases the entire bulk and weight, it is difficult to apply the touch panel to an LCD monitor, a notebook or personal computer, etc., which require light weight and thin characteristics. Also, the conventional additive type touch panel flat panel display has a problem in that, there is a large difference of refraction index with five boundary surfaces and a relatively large reflection as indicated by dotted lines in FIG. 1. Such problem results in poor light transmissivity.

FIG. 2 is a sectional view showing the structure of a conventional integral type touch panel flat panel display. Referring to FIG. 2, the conventional integral type touch panel flat panel display includes lower polarizer 10, LCD 20, touch panel 50 and upper polarizer 30 that are sequentially disposed. Touch panel 50 is inserted into flat panel display 40 including lower polarizer 10, LCD 20 and upper polarizer 30 to thereby form an integral type. In such a conventional flat panel display, since touch panel 50 is located at an inner side of the upper polarizer 30, it is referred to as an "inner touch panel".

Such a conventional integral type touch panel flat panel display has a structure almost analogous to the additive type touch panel flat panel display, except that touch panel 50 in the integral type is located between upper polarizer 30 and LCD 20 while touch panel 50 in the additive type is located over upper polarizer 30. The light transmissivity in the integral type is somewhat improved over the additive type.

The conventional integral type as described above also has a problem in that, since touch panel 50 including lower sheet 51 and upper sheet 52 is used similarly to the conventional additive type which increases the entire bulk and weight, it is difficult to apply the touch panel to an LCD monitor, a notebook or a personal computer, etc., which require light weight and thin characteristics. Also, the conventional additive type touch panel flat panel display has a problem in that, there is a large difference in the refraction index with five boundary surfaces and a relatively large reflection as indicated by dotted lines in FIG. 2. Such problem results in poor light transmissivity.

Furthermore, the conventional integral type touch panel flat panel display is limited in that, a light-isotropic film must be used for transparent conductive films of upper sheet 52 and lower sheet 51 of touch panel 50 because touch panel 50 is inserted between lower polarizer 10 and the upper polarizer.

According to a disclosure in the Japanese Patent Laid-open No. 9-24571, if a light-isotropic film is not used for the transparent conductive films of upper sheet 52 and lower sheet 51 of touch panel 50 that is inserted between lower polarizer 10 and upper polarizer 30, then an optical axis is not matched causing a coloration or a light interference due to an interference with lower polarizer 10.

Yet another problem with the conventional touch panel integral type flat panel display is that because touch panel 50 is inserted between upper polarizer 30 and LCD 20, mechanical characteristics such as a degree of hardness, heat-proof and scratch-proof, etc. related to upper sheet 52 of touch panel 50 must be provided to upper polarizer 30.

SUMMARY OF THE INVENTION

Accordingly, the present invention is directed to a polarizer integrated with transparent conductive film that substantially obviates one or more of the problems, limitations and disadvantages of the related art.

An object of the present invention is to provide a polarizer integrated with a transparent conductive film.

Another object of the present invention is to provide a touch panel integrated with the polarizer.

A further object of the present invention is to provide an integral type touch panel flat panel display.

Additional features and advantages of the present invention will be set forth in the description that follows and, in part, will be apparent from the description or may be learned by practice of the invention. The objectives and other advantages of the invention will be realized and attained by the structure as particularly pointed out in the written description and claims hereof, as well as the appended drawings.

In order to achieve these and other objects of the invention, a polarizer integrated with a transparent conductive film according to one aspect of the present invention includes a lower film; an optical film disposed over the lower film; and a transparent conductive film disposed over the optical film.

A polarizer integrated with a transparent conductive film according to another aspect of the present invention includes a polarizer in which a lower film, an optical film and an upper film are sequentially disposed; and a transparent conductive film positioned over the polarizer.

A touch panel integrated with a polarizer according to still another aspect of the present invention includes a first upper polarizer integrated with a transparent conductive film, said first upper polarizer including a first lower film, a first optical film and a first transparent conductive film that are sequentially disposed; and a touch panel including the first transparent conductive film and an upper sheet coated with spacers at the lower surface thereof and provided with bus bars and a tail.

A touch panel integrated with a polarizer according to still another aspect of the present invention includes a second upper polarizer integrated with a transparent conductive film, said second upper polarizer including a second lower film, a second optical film, a second upper film and a transparent conductive film that are sequentially disposed; and a touch panel including the transparent conductive film and an upper sheet coated with spacers at the lower surface thereof and provided with bus bars and a tail.

A flat panel display according to still another aspect of the present invention includes a lower polarizer including a lower film, an optical film and an upper film that are sequentially disposed; a liquid crystal display including a lower glass, an upper glass and a liquid crystal between the lower glass and the upper glass that are sequentially disposed over the lower polarizer; a first upper polarizer integrated with a transparent conductive film, said first upper polarizer including a first lower film, a first optical film and a transparent conductive film that are sequentially disposed over the liquid crystal display; and a touch panel including the transparent conductive film and an upper sheet coated with spacers at the lower surface thereof and provided with bus bars and a tail.

A flat panel display according to still another aspect of the present invention includes a lower polarizer having a lower film, an optical film and an upper film that are sequentially disposed; a liquid crystal display having a lower glass, an upper glass and a liquid crystal between the lower glass and the upper glass that are sequentially disposed over the lower polarizer; a second upper polarizer integrated with a transparent conductive film, said second upper polarizer having a second lower film, a second optical film, a second upper film and a transparent conductive film that are sequentially disposed over the liquid crystal display; and a touch panel having the transparent conductive film and an upper sheet coated with spacers at the lower surface thereof and provided with bus bars and a tail.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to a touch panel for a resistive film system employing a polarizer unified with a transparent conductive film. The polarizer unified with a transparent conductive film according to the present invention may be used for an upper surface of the LCD. The touch panel of the present invention is also applicable to a capacitance system. A flat panel display adopting a touch panel of resistive film employing a polarizer unified with a transparent conductive film is classified into an additive type and an integral type depending on a method of attaching the touch panel to the flat panel display.

According to the present invention, the transparent conductive film for the touch panel is integrated with the upper polarizer, so that the number of components can be reduced compared with the conventional flat panel display with an additive type touch panel and the conventional flat panel display with an integral type touch panel. Accordingly, it becomes possible to advantageously fabricate a flat panel display using a touch panel with light weight and thin characteristics. Also, the refraction index is large enough to reduce relatively large boundary surfaces (as indicated by dotted lines in FIG. 3) by two in comparison to the prior art, so that light transmissivity can be improved.

Furthermore, according to the present invention, because the touch panel is an outer touch panel (i.e., the touch panel is positioned at the uppermost portion to be externally exposed), it is unnecessary to use a light isotropic film as a transparent conductive film so as to match a light axis unlike a conventional flat panel display with an integral type touch panel employing an inner touch panel where such film must be used. In addition, the complication caused by a fact that mechanical characteristics such as a degree of hardness, heat-proof and scratch-proof, etc. must be provided to the upper polarizer can be eliminated.

Figure 1:
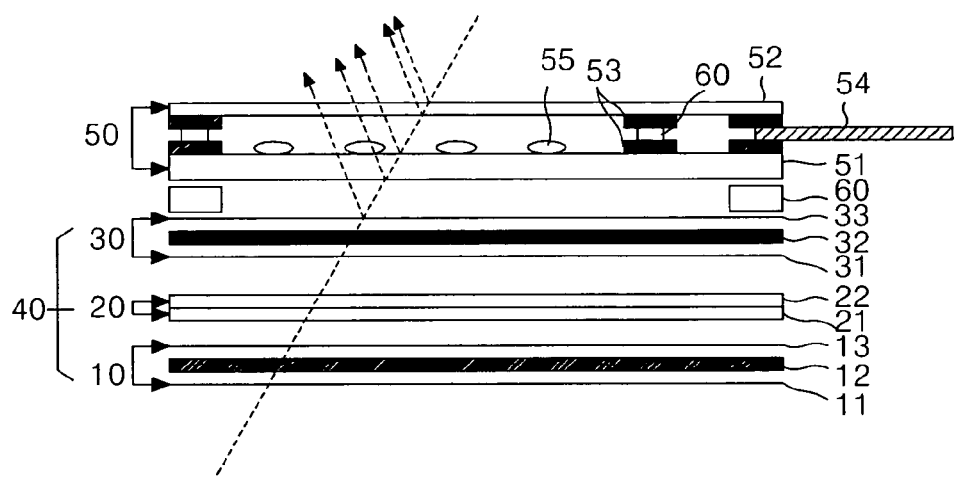
FIG. 1 is a sectional view showing the structure of a conventional additive type touch panel flat panel display.
Figure 2:
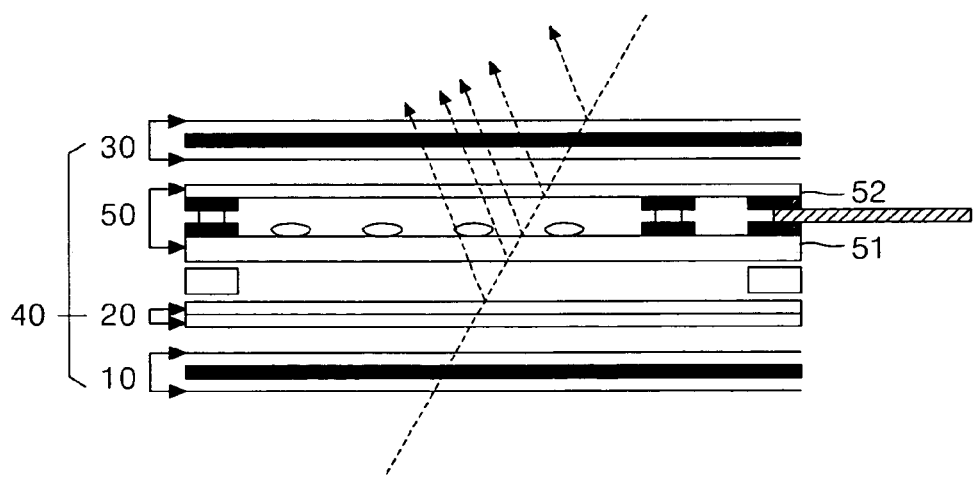
FIG. 2 is a sectional view showing the structure of a conventional integral type touch panel flat panel display.
Figure 3:
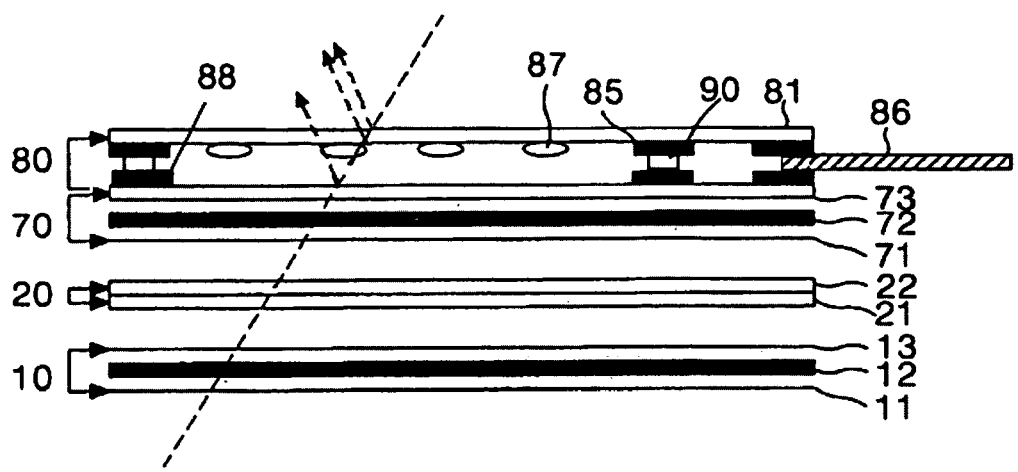
FIG. 3 is a sectional view showing the structure of a flat panel display according to an embodiment of the present invention.

Referring to FIG. 3, there is shown a flat panel display with an integral type touch panel according to an embodiment of the present invention. The flat panel display includes lower polarizer 10, LCD 20, upper polarizer 70 integrated with a transparent conductive film and touch panel 80. Touch panel 80 is a resistive film system having two resistive films in which one resistive film is integrated with upper polarizer 70 that is one part of the flat panel display. Since touch panel 80 is located at the uppermost portion of the flat panel display to be externally exposed, it is an outer touch panel.

Lower polarizer 10 includes lower film 11, optical film 12 and upper film 13 that are sequentially disposed. Upper film 13 and lower film 11 are adhered to the upper surface and the lower surface of optical film 12, respectively. Both lower film 11 and upper film 13 are preferably made from 3-acetyl-cellulose. Optical film 12 is preferably made from poly-vinyl-alcohol. Optical film 12 functions to polarize light, and lower film 11 and upper film 13 functions to maintain the mechanical strength of optical film 12.

LCD 20 includes lower glass 21 and upper glass 22 that are sequentially disposed. A liquid crystal is provided between lower glass 21 and upper glass 22. After all the edges of the lower glass 21 and the upper glass 22, except for one edge thereof are sealed, liquid crystal is injected through the one edge that has not been sealed. Then the unsealed edge is sealed. Both lower glass 21 and upper glass 22 are preferably made from an alkali-free glass. Lower glass 21 and upper glass 22 are responsible for enclosing the liquid crystal. Thin film transistors (TFTs) for driving the liquid crystal for each pixel are preferably integrated in lower glass 21.

Subsequently, upper polarizer 70 will be described along with touch panel 80. Although transparent conductive film 73 is integral with upper polarizer 70, it is one of two resistive films in the touch panel of the resistive film system. Upper polarizer 70 integrated with a transparent conductive film includes lower film 71, optical film 72 and transparent conductive film 73 that are sequentially disposed. Lower film 71 is responsible for maintaining the mechanical strength of optical film 72 and optical film 71 is responsible for polarizing light. Transparent conductive film 73 serves as a resistive film. The upper film in the conventional polarizer itself includes a lower film, an optical film and an upper film. In accordance with this present invention, the upper film found in the conventional polarizer may be replaced by a transparent conductive film 73.

Upper polarizer 70 of the present invention is formed by adhering lower film 71 to lower surface of the optical film 72, and by adhering transparent conductive film 73 printed with electrodes (that is, bus bars 88), for applying a voltage to the transparent conductive film 73, to the upper surface of optical film 72. This is done by using a different-type of film coated with an adhesive and cutting it into a desired size and then removing the different film.

Transparent conductive film 73 is preferable formed of two layers including base film 74 and conductive layer 75. Lower film 71 is preferably made from 3-acetyl-cellulose and optical film 72 is preferably made from poly-vinyl-alcohol. Base film 74 of transparent conductive film 73 is preferably made from poly-ethylene-terephthalate, poly-carbonate, co-polymer of cyclic-olefin or 3-acetyl-cellulose. Conductive layer 75 of transparent conductive film 73 is preferably made from indium tin oxide.

Touch panel 80 includes transparent conductive film 73 of upper polarizer 70, integrated with transparent conductive film 73, and upper sheet 81. At the lower surface of upper sheet 81, a plurality of dot spacers 87 are coated and bus bars 85 and tail 86 are provided. Upper sheet 81 preferably includes three layers including conductive layer 82 preferably formed of a transparent conductive film, base film 83 and anti-dazzling hard-coating layer 84. Touch panel 80 is preferably formed by adhering upper sheet 81 coated with spacers 87 at the lower portion thereof and adhered by adhesive 90 to transparent conductive film 73 of upper polarizer 70 integrated with transparent conductive film 73. Conductive layer 82 of upper sheet 81 is preferably made from indium tin oxide, and base film 83 of upper sheet 81 is preferably made from poly-ethylene-terephthalate. Anti-dazzling hard-coating layer 84 is preferably a resin-coated layer of acryl series mixed with a silica bead and bus bar 85 is preferably a silver electrode. Tail 86 is preferably a flexible printed circuit and spacer 87 is preferably and ultraviolet-hardened resin. Adhesive 90 may be replaced by a double-faced adhesive tape.

Upper sheet 81 includes conductive layer 82, which serves as a resistive film for the touch panel 80. Upper polarizer 70 includes the transparent conductive film 73 which serves as a resistive film for the touch panel 80. Bus bars 85 and 88 serves as electrodes for applying a voltage to the resistive films, respectively. Tail 86 serves to connect bus bars 85 and 88 with a controller positioned at the rear portion of the flat panel display. Spacer 87 serves to space transparent conductive film 73 of upper polarizer 70 which is a resistive film from upper sheet 81. Lower polarizer 10, LCD 20, upper polarizer 70 integrated with transparent conductive film 73 and touch panel 80 are held together by an adhesive or a double-faced adhesive tape.

Figure 4:
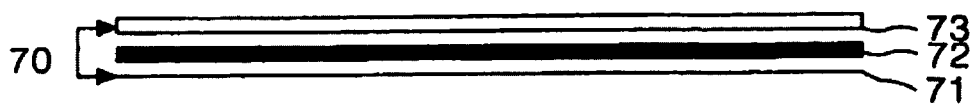
FIG. 4 is a sectional view showing the structure of a polarizer integrated with a transparent conductive film according to an embodiment of the present invention.

Referring now to FIG. 4, there is shown an upper polarizer integrated with a transparent conductive film according to an embodiment of the present invention. Upper polarizer 70 includes lower film 71, optical film 72 and transparent conductive film 73 that are sequentially disposed.

Figure 5:
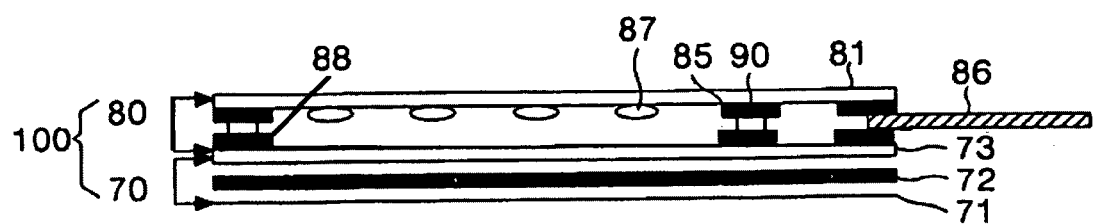
FIG. 5 is a sectional view showing the structure of a touch panel integrated with a polarizer according to an embodiment of the present invention.

Referring to FIG. 5, there is shown a touch panel integrated with a polarizer according to an embodiment of the present invention. Touch panel unit 100 integrated with a polarizer includes polarizer 70 integrated with a transparent conductive film and touch panel 80 coated with dot spacers 87 at the lower surface thereof and provided with bus bars 85 and tail 86. Touch panel 80 includes transparent conductive film 73 which is an upper or uppermost layer of upper polarizer 70 integrated with transparent conductive film 73, and upper sheet 81 coated with spacers 87 at the lower surface thereof and provided with bus bars 85 and tail 86. Otherwise, upper polarizer 70 integrated with transparent conductive film 73 may be fabricated by attaching transparent conductive film 73 to the upper surface of conventional polarizer 30 having lower film 31, optical film 32 and upper film 33.

Figure 6:
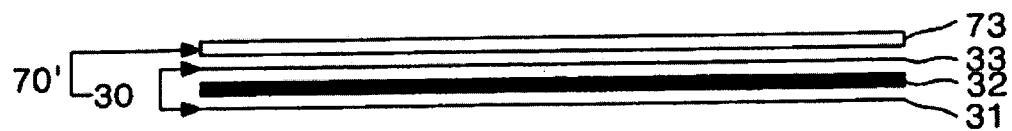
FIG. 6 is a sectional view showing the structure of a touch panel integrated with a transparent conductive film according to another embodiment of the present invention.
Figure 7:
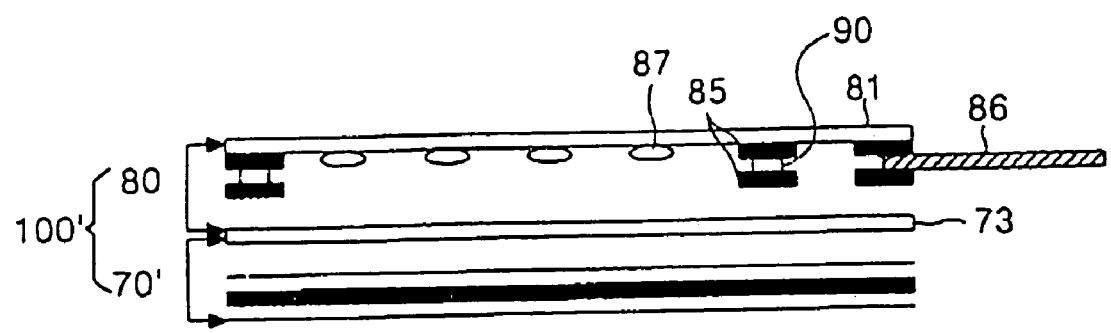
FIG. 7 is a sectional view showing the structure of a touch panel integrated with a polarizer according to another embodiment of the present invention.
Figure 8:
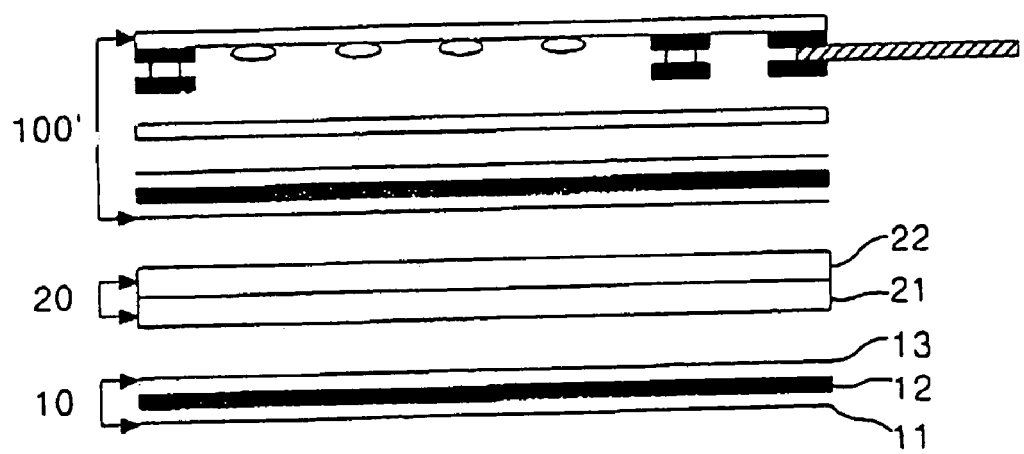
FIG. 8 is a sectional view showing the structure of a flat panel display according to another embodiment of the present invention.

FIG. 6 to FIG. 8 show a polarizer integrated with a transparent conductive film, a touch panel integrated with the polarizer and a flat panel display with an integral type touch panel that employ the conventional polarizer 30, respectively. More specifically, FIG. 6 is a sectional view showing the structure of polarizer 70' integrated with transparent conductive film according to another embodiment of the present invention in which transparent conductive film 73 is attached to the upper surface of the conventional polarizer 30. In FIG. 6, transparent conductive film 73 is positioned over conventional polarizer 30 having lower film 31, optical film 32 and upper film 33 disposed sequentially.

FIG. 7 is a sectional view showing the structure of a touch panel unit integrated with a polarizer according to another embodiment of the present invention. In FIG. 7, touch panel unit 100' integrated with a polarizer includes polarizer 70' integrated with a transparent conductive film and touch panel 80. Touch panel 80 has transparent conductive film 73 and upper sheet 81 coated with dot spacers at the lower surface thereof and provided with bus bars 85 and tail 86. Thus, touch panel 80 and polarizer 70 share the function of transparent conductive film 73.

FIG. 8 is a sectional view showing the structure of a flat panel display with an integral type touch panel according to another embodiment of the present invention. In FIG. 8, the flat panel display includes lower polarizer 10, LCD 20, and touch panel unit 100. Lower polarizer 10 has lower film 11, optical film 12 and upper film 13. LCD 20 has lower glass 21, upper glass 22 and liquid crystal between lower glass 21 and upper glass 22 that are sequentially disposed over lower polarizer 10. Touch panel unit 100' is integrated with a polarizer, as explained with reference to FIG. 7, positioned over LCD 20.

According to the present invention, the transparent conductive film for the touch panel is integrated with the polarizer, so that the number of components can be reduced compared with the conventional flat panel display with an additive type touch panel and the conventional flat panel display with an integral type touch panel. Accordingly, the present invention makes it possible to advantageously fabricate a flat panel display using a touch panel with light weight and thin characteristics. Also, a refraction index is large enough to reduce relatively large boundary surfaces, as indicated with dotted lines in FIG. 3, into two in comparison to the conventional embodiments. Accordingly, the present invention improves light transmissivity.

Furthermore, according to the present invention, since the touch panel is an outer touch panel where it is positioned at the upper portion for external exposure, it is unnecessary to use a light isotropic film as a transparent conductive film to match a light axis as in the conventional flat panel display with an integral type touch panel employing an inner touch panel. In addition, mechanical characteristics such as degree of hardness, heat-proof and scratch-proof, which must be provided for the upper polarizer in the conventional embodiment, can be eliminated.

Accordingly, the present invention includes a polarizer integrated with a transparent conductive film that is made up of a lower film, an optical film and a transparent conductive film for a liquid crystal display device. Also, the present invention includes a touch panel integrated with the polarizer that is formed by attaching an upper sheet with a transparent conductive film onto the upper surface of the polarizer integrated with the transparent conductive film. Furthermore, the present invention includes a flat panel display integrated with the touch panel which is integral to the flat panel display having a lower polarizer, a liquid crystal display device and an upper polarizer.

Moreover, the polarizer integrated with a transparent conductive film applied to the present invention has an advantage in that, since a general capacitive touch panel has a single of transparent conductive film or transparent conductive glass, it is applicable to a capacitive touch panel integrated with a flat panel display.

It will be apparent to those skilled in the art that various modifications and variation can be made in the described embodiments of the present invention without departing from the spirit or scope of the invention. Thus, it is intended that the present invention covers the modifications and variations of this invention provided they come within the scope of the appended claims and their equivalents.

What is claimed:

1. A polarizer for a touch panel and a liquid crystal display panel, the polarizer comprising:
   a lower film;
   an optical film polarizing light for the liquid crystal display panel over the lower film; and
   a resistive film printed with electrodes over the optical film, wherein the resistive film includes a base film and transparent conductive layer and serves as one of a pair of resistive films for the touch panel,
   wherein the lower film and the base film are formed to maintain the mechanical strength of the optical film,
   wherein the polarizer including the optical film and the resistive film is made by a method including:
   adhering the lower film to a lower surface of the optical film; and
   adhering the resistive film printed with electrodes to an upper surface of the optical film, wherein the resistive film is cut into a predetermined size and then is adhered to the optical film.

2. The polarizer as claimed in claim 1, wherein the lower film is made from a 3-acetyl-cellulose, wherein the base film of the resistive film is made from a substance selected from a group consisting of poly-ethylene-terephthalate, poly-carbonate, and a co-polymer of cyclic-olefin and 3-acetyl-cellulose.

3. The polarizer as claimed in claim 1, wherein the optical film includes poly-vinyl alcohol.

* * * * *